Figure 1:
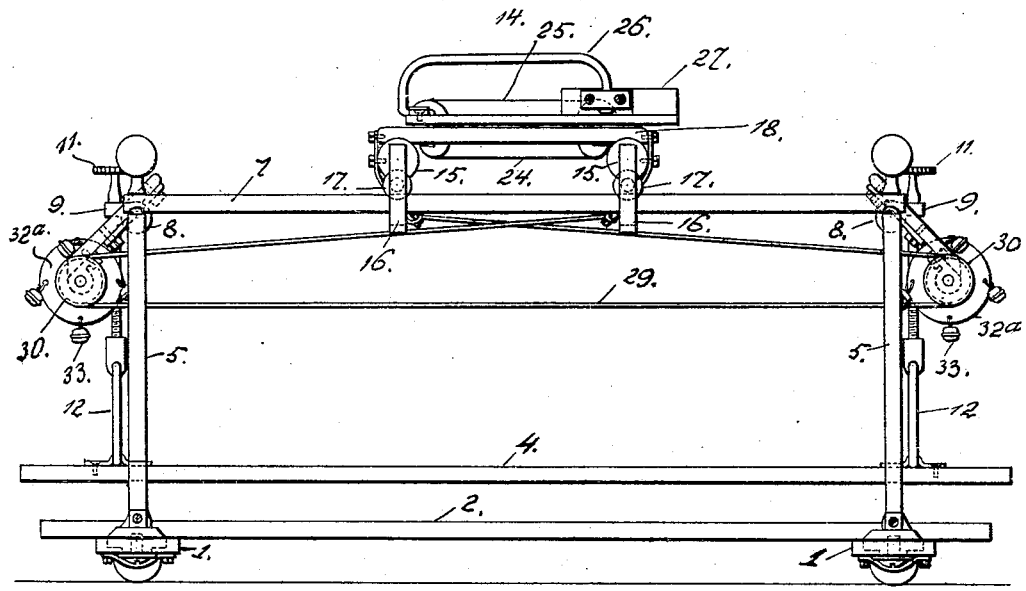

No. 875,377. PATENTED DEC. 31, 1907.
V. PILIA & H. BOOKER.
TRAINING DEVICE.
APPLICATION FILED AUG. 22, 1907.

2 SHEETS—SHEET 1.

Inventors
Vito Pilia and
Harris Booker

Witnesses

By

Attorneys

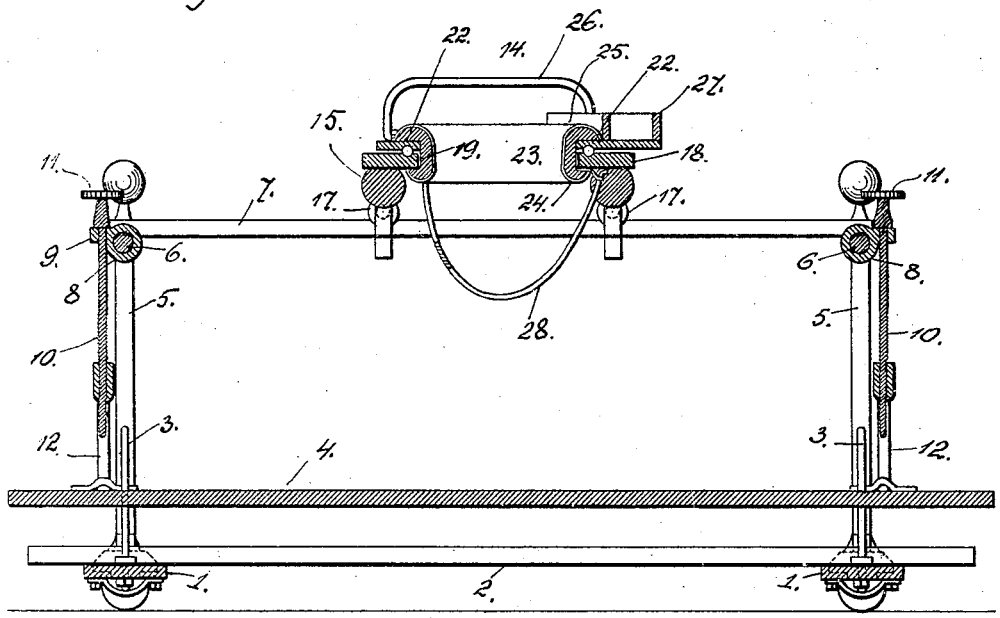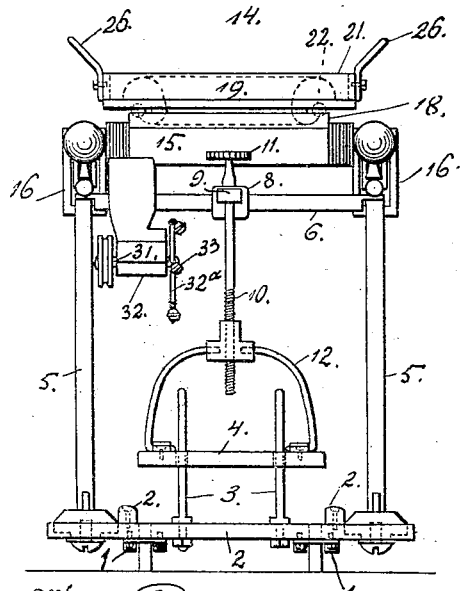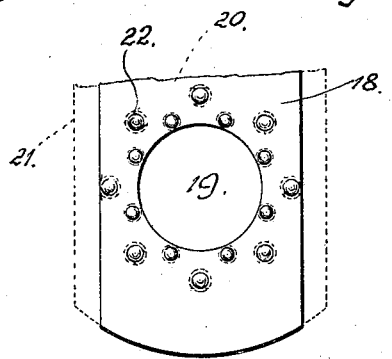

UNITED STATES PATENT OFFICE.

VITO PILIA AND HARRIS BOOKER, OF CALIFORNIA, PENNSYLVANIA.

TRAINING DEVICE.

No. 875,377.  Specification of Letters Patent.  Patented Dec. 31, 1907.

Application filed August 22, 1907. Serial No. 389,670.

*To all whom it may concern:*

Be it known that we, VITO PILIA and HARRIS BOOKER, citizens of the United States of America, residing at California, in the county of Washington and State of Pennsylvania, have invented certain new and useful Improvements in Training Devices, of which the following is a specification, reference being had therein to the accompanying drawing.

This invention relates to improvements in training devices, and the invention relates more particularly to a novel device for training children to walk.

The invention has for its object to provide a novel device for training and assisting babies to walk, the device being adjustable and provided with novel means for supporting infants and attracting infants' attention, whereby the device will appear more as an amusement novelty than as a training device. To this end, we have devised a movable support for infants and a tread-way which can be adjusted, whereby infants of various ages can be trained to walk, without disfiguring or injuring the infant's limbs. Our improved device not only serves for training an infant to walk, but serves as an amusement device for an infant, allowing the infant to face in various directions, but principally attracting the infant in two directions, thus causing an infant to walk or make an attempt to do the same.

The detail construction entering into our invention will be presently described and then specifically pointed out in the appended claims.

Figure 2:
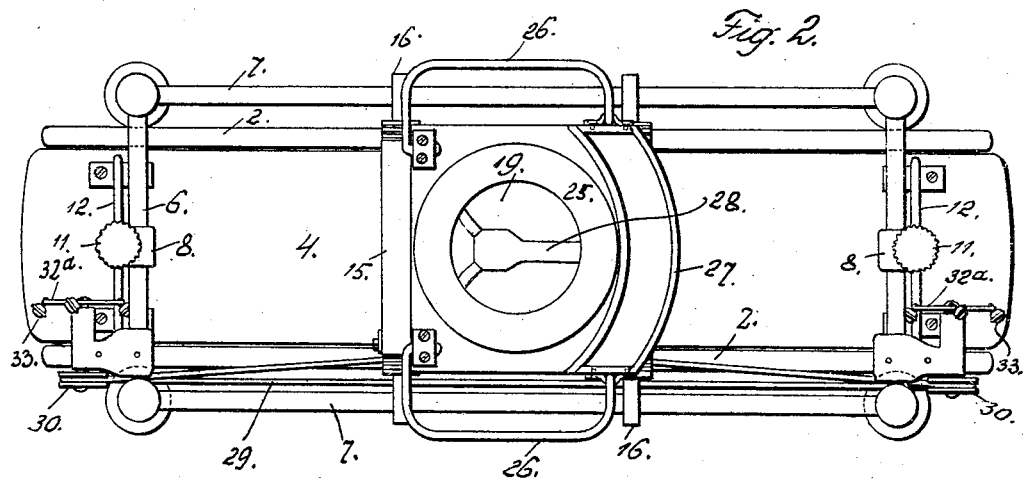

Referring to the drawings forming a part of this specification, like numerals of reference designate corresponding parts throughout the several views, in which:

Figure 1 is an elevation of a training device, Fig. 2 is a plan of the same, Fig. 3 is a longitudinal sectional view of the device, Fig. 4 is an end view thereof, and Fig. 5 is a plan of a portion of the device.

To put our invention into practice, we construct the training device of a rectangular framework embodying trucks 1 connected by longitudinally disposed beams 2, the trucks permitting of the device being easily moved from one location to another. Each truck is provided with vertically disposed guide pins 3, passing through an adjustable platform 4, said platform constituting the tread-way of the device.

The trucks 1 are provided with detachable standards 5 connected by cross heads 6 and longitudinally disposed rods 7. The cross heads are provided with adjustable sleeves 8 carrying bearings 9 for vertically disposed threaded rods 10, which are provided with knurled heads 11, whereby the threaded rods can be easily rotated. The rods 10 pass through yokes 12 carried by the platform or tread-way 4 of the device, thus permitting of either end of the platform or tread-way 4 being elevated.

Movably mounted upon the longitudinally disposed rods 7 is an infant's support 14, said support comprising transverse girders 15 having housings 16 for rollers 17, which travel upon the rods 7 and sustain the support 14. The girders 15 are connected by a plate 18 having a central opening 19 surrounded by a plurality of ball sockets 20, for a plurality of ball bearings 21 carried by a revoluble frame 22, said frame having a central opening 23 with rounded edges 24, which are covered with felt, velvet or similar material 25. This covering 25 prevents an infant from being injured by the edges of the frame, and at the same time prevents an infant from marring or injuring the frame. Detachable side handles 26 and a tray 27 are carried by the frame 22, besides a depending triangular elastic holder 28 for an infant, this holder supporting the body of the infant and allowing the feet of the infant to rest upon the tread-way or platform 4 of the training device.

Attached to the transverse girders 15 are the ends of an endless cable 29, which pass over grooves or pulleys 30, carried by shafts 31 journaled in bearings 32, carried by the heads 6, the opposite ends of said shaft being provided with disks 32ª, carrying rattlers or bells 33, adapted to attract an infant's attention to either end of the training device.

Since the infant's attention is attracted to the ends of the device, an infant placed in the supporter 14 will endeavor to reach either end of the device, and since the plate 18 is movably mounted upon the beam 7, and the frame 22 revolubly mounted upon said plate, an infant can move to either end of the device. The holder 28 of the device prevents the weight of an infant's body from exerting a pressure upon the infant's limbs, that might cause an infant's legs to be injured or distorted to that extent commonly known as "bow-legged". The revoluble frame with its handles is adapted to permit of an infant partially supporting itself, and by elevating either end of the platform or tread-way 4, the approach to either end of the training device can be made more difficult, and the adjustment of the platform or tread-way is principally provided whereby the device can be adjusted as an infant grows or to accommodate infants of various sizes.

The training device can be disassembled in parts and folded when not to be used or when to be stored away.

While I have herein provided the device with an audible amusement for attracting an infant's attention, it is obvious that other amusements either audible or visible can be provided. It is also apparent that various arrangements of ball bearings or their mechanical equivalents can be used for insuring an easy and free revoluble movement of the frame 22. Such other changes in the structural details of my invention as are permissible by the appended claims can be resorted to without departing from the spirit and scope of the invention.

Having fully described our invention, what we claim and desire to secure by Letters Patent, is:—

1. A training device consisting of a rectangular frame-work embodying trucks, standards and cross heads connected by rods, a platform or tread-way adjustably suspended from said cross heads, a plate movably mounted upon said rods, and having a central opening, an elastic holder carried by said plate, a frame revolubly mounted in said opening, a tray carried by said frame, side handles carried by said frame, bearings carried by said cross heads, disks revolubly supported by said bearings, pulleys mounted for rotation with said disks, and a cable passing over said pulleys and connecting indirectly with said plate, for revolving said disk when said plate is moved.

2. A training device consisting of a movable rectangular frame-work, a plate movably mounted upon said frame-work and having a central opening, and an elastic triangular holder carried by said plate, a frame revolubly mounted upon said plate and having a central opening, a tray carried by said frame, handles carried by said frame, bearings supported at the ends of said rectangular frame-work, revoluble amusement devices carried by said bearings, a cable moved by said plate for actuating said amusement devices, and an adjustable platform or tread-way suspended in said frame-work.

3. A training device consisting of a movable frame-work, a platform or tread-way adjustably mounted in said frame-work, a plate movably mounted upon said frame-work and having an opening formed therein, a frame revolubly mounted upon said plate, handles carried thereby, bearings carried by said frame-work at the ends thereof, revoluble amusement devices carried by said bearings, and means actuated by the movement of said plate for revolving said amusement devices.

4. A training device consisting of a movable frame-work, a platform or tread-way adjustably mounted in said frame-work, a plate movably mounted upon said frame-work and having an opening formed therein, a frame revolubly mounted upon said plate, bearings carried by said frame-work at the ends thereof, revoluble amusement devices carried by said bearings, and means actuated by the movement of said plate for revolving said amusement devices.

5. A training device consisting of a movable frame-work, an adjustable tread-way carried thereby, a revoluble frame supported by said frame-work and movable longitudinally thereon, an elastic holder arranged beneath said frame, amusement devices supported at the ends of said frame-work, and means actuated by the longitudinal movement of said frame for operating said amusement devices.

6. A training device consisting of a movable frame-work, an adjustable tread-way carried thereby, a revoluble frame supported by said frame-work and movable longitudinally thereon, amusement devices supported at the ends of said frame-work, and means actuated by the longitudinal movement of said frame for operating said amusement devices.

In testimony whereof I affix my signature in the presence of two witnesses.

VITO PILIA.
HARRIS BOOKER.

Witnesses:
T. J. UNDERWOOD,
REBECCA GRIFFIN.